United States Patent
Hou et al.

(10) Patent No.: US 12,517,549 B2
(45) Date of Patent: Jan. 6, 2026

(54) SUPPORT STRUCTURAL MEMBER AND DISPLAY DEVICE

(71) Applicant: KUNSHAN NEW FLAT PANEL DISPLAY TECHNOLOGY CENTER CO., LTD., Jiangsu (CN)

(72) Inventors: Hongqi Hou, Jiangsu (CN); Liwei Ding, Jiangsu (CN); Yuhua Wu, Jiangsu (CN); Fu Liao, Jiangsu (CN); Zhaoji Zhu, Jiangsu (CN); Kanglong Sun, Jiangsu (CN)

(73) Assignee: KUNSHAN NEW FLAT PANEL DISPLAY OLOGY CENTER CO., LTD., Kunshan (CN)

( * ) Notice: Subject to any disclaimer, the term of this patent is extended or adjusted under 35 U.S.C. 154(b) by 231 days.

(21) Appl. No.: 18/336,300

(22) Filed: Jun. 16, 2023

(65) Prior Publication Data
US 2023/0324951 A1    Oct. 12, 2023

Related U.S. Application Data

(63) Continuation of application No. PCT/CN2021/137878, filed on Dec. 14, 2021.

(30) Foreign Application Priority Data

Apr. 9, 2021 (CN) .......................... 202110387433.7

(51) Int. Cl.
*G06F 1/16* (2006.01)
*G09F 9/30* (2006.01)
*H04M 1/02* (2006.01)

(52) U.S. Cl.
CPC .......... *G06F 1/1601* (2013.01); *G06F 1/1652* (2013.01); *G09F 9/301* (2013.01); *H04M 1/0268* (2013.01)

(58) Field of Classification Search
CPC .... G06F 1/1601; G06F 1/1652; G06F 1/1624; G09F 9/301; H04M 1/0268
See application file for complete search history.

(56) References Cited

U.S. PATENT DOCUMENTS 10,321,583 B2 * 6/2019 Seo ...................... G06F 1/1624
2012/0162876 A1    6/2012 Kim
(Continued)

FOREIGN PATENT DOCUMENTS

| CN | 101345008 A | 1/2009 |
|----|----|----|
| CN | 104409648 B | 3/2015 |

(Continued)

OTHER PUBLICATIONS

Office Action issued on Apr. 2, 2024, in corresponding Japanese Application No. 2023-538863, 10 pages.

(Continued)

*Primary Examiner* — Allen L Parker
*Assistant Examiner* — Peter Krim
(74) *Attorney, Agent, or Firm* — Maier & Maier, PLLC

(57) ABSTRACT

A support structural member and a display device. The support structural member includes: a support frame, having a screen body support surface, in which the support frame includes a first sliding support member and a second sliding support member arranged opposite to each other, and the first sliding support member and the second sliding support member are movably connected in a first direction; a driving portion, including a first driving mechanism, in which the first driving mechanism is configured to drive the first sliding support member and the second sliding support member to move relatively to each other in the first direction to drive the first sliding support member and the second sliding support member approach to or far away from each other.

19 Claims, 9 Drawing Sheets

(56) References Cited

U.S. PATENT DOCUMENTS

| | | | |
|---|---|---|---|
| 2018/0014417 A1 | 1/2018 | Seo et al. | |
| 2018/0077808 A1 | 3/2018 | Seo et al. | |
| 2020/0304613 A1 | 9/2020 | Cha et al. | |
| 2022/0132687 A1* | 4/2022 | Liu | G09F 9/301 |
| 2022/0311849 A1* | 9/2022 | Jia | H04M 1/0268 |
| 2023/0108833 A1* | 4/2023 | Feng | G06F 1/1624 |
| | | | 455/566 |
| 2023/0135495 A1* | 5/2023 | Teng | G06F 1/1658 |
| | | | 361/679.01 |

FOREIGN PATENT DOCUMENTS

| | | |
|---|---|---|
| CN | 106884867 A | 6/2017 |
| CN | 110572497 A | 12/2019 |
| CN | 111176382 A | 5/2020 |
| CN | 111510536 A | 8/2020 |
| CN | 111562818 A | 8/2020 |
| CN | 111819388 A | 10/2020 |
| CN | 111968503 A | 11/2020 |
| CN | 112082059 A | 12/2020 |
| CN | 112153181 A | 12/2020 |
| CN | 112309258 A | 2/2021 |
| CN | 112797277 A | 5/2021 |
| CN | 112882540 A | 6/2021 |
| CN | 113063075 A | 7/2021 |
| CN | 113066385 A | 7/2021 |
| CN | 113099015 A | 7/2021 |
| CN | 113496656 A | 10/2021 |
| DE | 102013109104 A1 | 2/2015 |
| JP | 2012134971 A | 7/2012 |
| JP | 2019537256 A | 12/2019 |
| JP | 2023541648 A | 10/2023 |

OTHER PUBLICATIONS

Search Report issued on Mar. 12, 2024, in corresponding Japanese Application No. 2023-538863, 36 pages.

Office Action issued On Apr. 1, 2022, in corresponding Chinese Application No. 202110387433.7, 10 pages (partial English translation provided).

Office Action issued On Sep. 7, 2022, in corresponding Chinese Application No. 202110387433.7, 11 pages (partial English translation provided).

International Search Report mailed on Mar. 9, 2022, in corresponding International Application No. PCT/CN2021/137878, 8 pages (partial English translation provided).

Office Action issued on Sep. 10, 2024, in corresponding Japanese Application No. 2023-538863, 5 pages.

* cited by examiner

SUPPORT STRUCTURAL MEMBER AND DISPLAY DEVICE

CROSS REFERENCE TO RELATED APPLICATION

The present application is a continuation of International Application No. PCT/CN2021/137878, filed on Dec. 14, 2021, which claims priority to Chinese Patent Application No. 202110387433.7, filed on Apr. 9, 2021, titled "SUPPORT STRUCTURAL MEMBER AND DISPLAY DEVICE", both of which are hereby incorporated by reference in their entireties.

TECHNICAL FIELD

The present application relates to the technical field of display, and in particular to a support structural member and a display device.

BACKGROUND

A flexible screen has the characteristics that it can be bent freely, so that it can enable an electronic product to get rid of the rigid structure and realize the diversified structures in form. Therefore, the flexible screen product is considered to be the mainstream of future display product development.

The flexible screen product that has a large display screen when in use and occupies a small storage space when idle can provide users with a better experience. The flexible screen product adopts a sliding-stretching form to meet the requirement of the consumer for a portable large screen. The flexible screen may be affected by the stretching speed during the stretching process, which may cause the problem that the user may wait for a long time.

SUMMARY

The present application provides a support structural member and a display device, which aims to solve the problem of long waiting time for users caused by the stretching speed of the display device.

In a first aspect, a support structural member for a display device provided by embodiments of the present application includes: a support frame, having a screen body support surface, in which the support frame includes a first sliding support member and a second sliding support member arranged opposite to each other, and the first sliding support member and the second sliding support member are movably connected in a first direction; a driving portion, including a first driving mechanism, in which the first driving mechanism is configured to drive the first sliding support member and the second sliding support member to move relatively to each other in the first direction to drive the first sliding support member and the second sliding support member approach to or far away from each other.

In a second aspect, a display device provided by the present application includes: a flexible screen; and the support structural member according to any one of embodiments as described above, in which the screen body support surface is configured to support the flexible screen, a first end of the flexible screen is connected to an end of the first sliding support member away from the second sliding support member, and a second end of the flexible screen is wrapped around the second sliding support member and bent towards a side of the support frame facing away from the screen body support surface; or the second end of the flexible screen is connected to an end of the second sliding support member away from the first sliding support member, and a first end of the flexible screen is wrapped around the first sliding support member and bent towards a side of the support frame facing away from the screen body support surface; or a first end of the flexible screen is wrapped around the first sliding support member and bent towards a side of the support frame facing away from the screen body support surface, and a second end of the flexible screen is wrapped around the second sliding support member and bent towards a side of the support frame facing away from the screen body support surface.

The support structural member and the display device are provided by the embodiments of the present application. The support structural member is apply to the display device. The support structural member includes the support frame and the driving portion, the support frame includes the first sliding support member and the second sliding support member arranged opposite to each other, the driving portion includes a first driving mechanism, the first driving mechanism can drive the first sliding support member and the second sliding support member to move in the first direction simultaneously, so that the first sliding support member and the second sliding support member can approach to or far away from each other, thereby increasing the stretching-and-shrinking speed of the support frame, and further increasing the unfolding speed and the storage speed of the display device.

DETAILED DESCRIPTION

Features and exemplary embodiments in various aspects of the present application will be described in detail below. In order to make the objects, technical solutions and advantages of the present application clearer, the present application will be further described in detail below in conjunction with the drawings and the specific embodiments. It should be understood that the specific embodiments described here are only configured to explain the present application, not to limit the present application. It is apparent to one skilled in the art that the present application can be practiced without some of these specific details. The description of the embodiments below is only to provide a better understanding of the present application by showing examples of the present application.

In order to better understand the present application, the embodiments of the present application will be described referring to FIG. 1 to FIG. 11.

Figure 1:
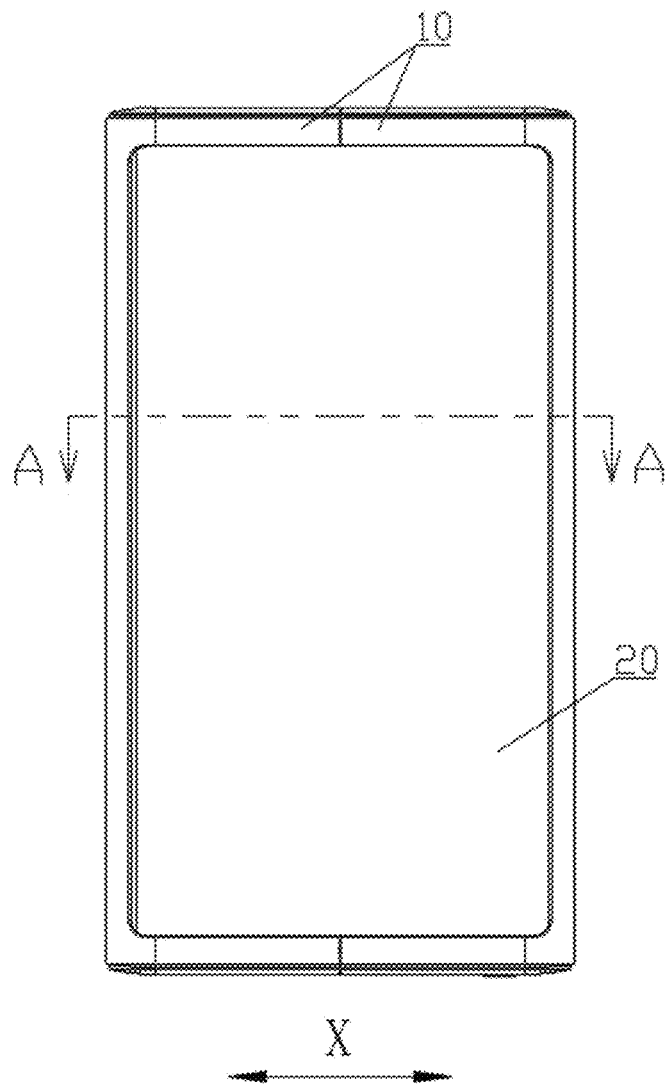
FIG. 1 shows a schematic structural view of a display device in a storage state provided by an embodiment of the present application.
Figure 2:
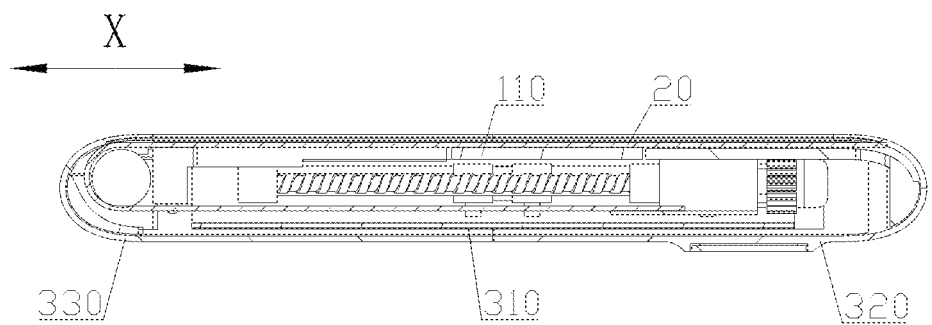
FIG. 2 shows a sectional view of A-A line in FIG. 1.
Figure 3:
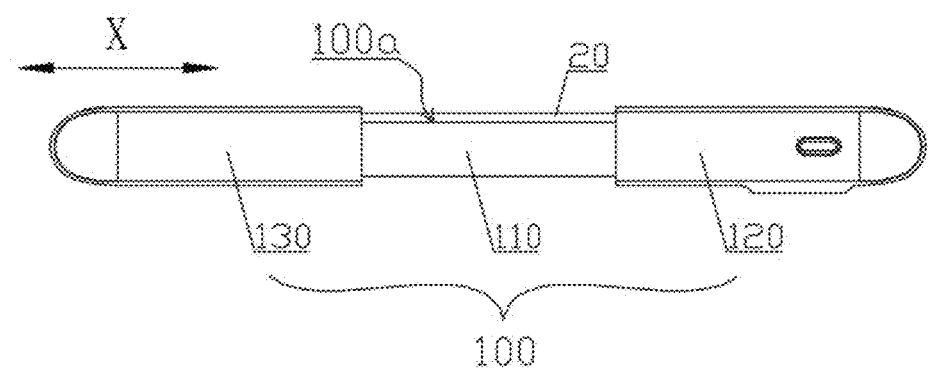
FIG. 3 shows a side view of a display device in an unfolding state provided by an embodiment of the present application.
Figure 4:
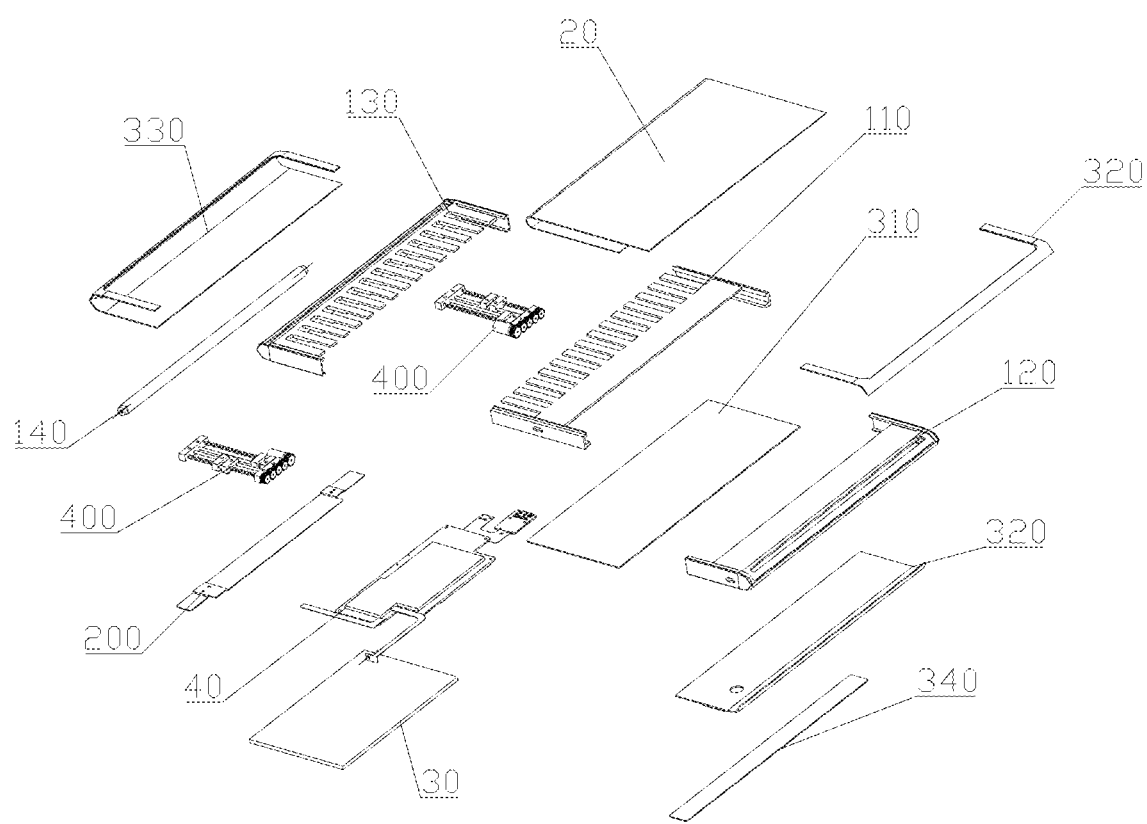
FIG. 4 shows an exploded structural schematic view of a display device provided by an embodiment of the present application.

FIG. 1 shows a schematic structural view of a display device in a storage state provided by an embodiment of the present application; FIG. 2 shows a sectional view of A-A line in FIG. 1; FIG. 3 shows a side view of a display device in an unfolding state provided by an embodiment of the present application; FIG. 4 shows an exploded structural schematic view of a display device provided by an embodiment of the present application.

As shown in FIG. 1, a display device provided by an embodiment of the present application includes a flexible screen 20 and a support structural member 10, and the support structural member 10 can provide support for the flexible screen 20.

The display device in the embodiments of the present application includes but is not limited to a mobile phone, a tablet computer, an e-book, a television, an access control, a smart fixed phone, a console and other devices with the display function.

Optionally, the flexible screen 20 may be an organic light emitting diode (OLED) display screen, a liquid crystal display (LCD) display screen, or an electronic paper with the bending and deformation capabilities.

As shown in FIG. 2 and FIG. 3, the support structural member 10 can be arranged telescopically. The support structural member 10 includes a support frame 100, the support frame 100 has a screen body support surface 100a for supporting the flexible screen 20, and the screen body support surface 100a can be a surface of the support frame 100 facing a user. The flexible screen 20 is laid on the screen body support surface 100a of the support frame 100, and at least one end of the flexible screen 20 is wrapped around the support frame 100 and bent towards a side of the support frame 100 facing away from the screen body support surface 100a.

When the support frame 100 is unfolded, an area of the screen body support surface 100a will increase; a part of the flexible screen 20 located at the side of the support frame 100 facing away from the screen body support surface 100a will move to a side where the screen body support surface 100a is located, so as to realize the unfolding of the flexible screen 20, so that it can increase a display area of the display device. When the support frame 100 is retracted, the area of the screen body support surface 100a will decrease; a part of the flexible screen 20 will move from the side of the support frame 100 where the screen body support surface 100a is located to the side facing away from the screen body support surface 100a, so as to realize the retracting of the flexible screen 20, so that it can decrease the display area of the display device.

The support frame 100 includes a first sliding support member 120 and a second sliding support member 130 arranged opposite to each other, and the first sliding support member 120 and the second sliding support member 130 are movably connected in a first direction X. The first sliding support member 120 and the second sliding support member 130 can simultaneously move towards each other or away from each other in the first direction X, so that the first sliding support member 120 and the second sliding support member 130 can approach to or move away from each other simultaneously, which can improve the speed of stretching-and-shrinking of the support frame 100 and increase the unfolding speed and the storage speed of the display device.

In the present application, when the first sliding support member 120 and the second sliding support member 130 move in the first direction X simultaneously, the first sliding support member 120 and the second sliding support member 130 can move opposite to each other in the first direction X simultaneously, that is, the first sliding support member 120 and the second sliding support member 130 are displaced in directions away from each other to realize the unfolding of the support frame 100. Or the first sliding support member 120 and the second sliding support member 130 move towards each other in the first direction X simultaneously, that is, the first sliding support member 120 and the second sliding support member 130 are displaced toward each other to realize the retraction of the support frame 100.

In the present application, when the first sliding support member 120 and the second sliding support member 130 move towards each other or away from each other in the first direction X simultaneously, the moving velocitys of the first sliding support member 120 and the second sliding support member 130 may be the same or different.

In order to facilitate mounting the first sliding support member 120 and the second sliding support member 130, the support frame 100 may further include a main body support member 110. Each of the first sliding support member 120 and the second sliding support member 130 may be movably connected to the main body support member 110 in the first direction X. When the first sliding support member 120 and the second sliding support member 130 move in the first direction X simultaneously, the first sliding support member 120 and the second sliding support member 130 approach to or move away from each other with respect to the main body support member 110 simultaneously.

The flexible screen 20 has a first end and a second end opposite to each other in the first direction X. The first end of the flexible screen 20 may be connected to an end of the first sliding support member 120 away from the second sliding support member 130, and the second end of the flexible screen 20 is wrapped around the second sliding support member 130 and bent towards the side of the support frame 100 facing away from the screen body support surface 100a. When the support frame 100 is stretched or shrunk, the flexible screen 20 is unfolded and retracted by moving the second end of the flexible screen 20.

Optionally, when the flexible screen 20 is mounted on the support structural member 10, the first end of the flexible screen 20 can also be wrapped around the first sliding support member 120 and bent towards the side of the support frame 100 facing away from the screen body support surface 100a, and the second end of the flexible screen 20 is connected to the end of the second sliding support member 130 away from the first sliding support member 120. When the support frame 100 is stretched or shrunk, the flexible screen 20 is unfolded and retracted by moving the first end of the flexible screen 20.

Optionally, the first end of the flexible screen 20 can also be wrapped around the first sliding support member 120 and bent towards the side of the support frame 100 facing away from the screen body support surface 100a, and the second end of the flexible screen 20 can be wrapped around the second sliding support member 130 and bent towards the side of the support frame 100 facing away from the screen body support surface 100a. When the support frame 100 is stretched or shrunk, the flexible screen 20 is unfolded and retracted by moving the first end and second end of the flexible screen 20.

As shown in FIG. 2 to FIG. 4, the support structural member 10 may also include a shielding portion. The shielding portion is arranged outside the support frame 100, and the shielding portion is spaced apart from the support frame 100, so that the flexible screen 20 can be located between the support frame 100 and the shielding portion.

The shielding portion may include a main body back plate 310, a first sliding protection cover 320 and a second sliding protection cover 330. The main body back plate 310 is arranged at a side of the main body support member 110 facing away from the screen body support surface 100*a*. The first sliding protection cover 320 is connected to the first sliding support member 120. The second sliding protection cover 330 is connected to the second sliding support member 130. During a stretching-and-shrinking process of the support structural member 10, the first sliding protection cover 320 moves along with the first sliding support member 120, and the second sliding protection cover 330 moves along with the second sliding support member 130. A visible window may be enclosed and formed between the first sliding protection cover 320 and the second sliding protection cover 330, and the flexible screen 20 may be exposed through the visible window.

Optionally, the second sliding protection cover 330 may include a screen body pressure frame and a sliding back plate, and the second end of the flexible screen 20 may be connected to the second sliding support member 130 through the screen body pressure frame. Certainly, the second sliding protection cover 330 may also be of an integral structure.

The shielding portion may also include a camera cover plate 340. The camera cover plate 340 is arranged at the side of the main body support member 110 facing away from the screen body support surface 100*a*, and the camera cover plate 340 can be connected to the main body back plate 310. The main body back plate 310, the camera cover plate 340, the first sliding protection cover 320 and the second sliding protection cover 330 enclose to form a protection cavity. Each of the support structural member 10 and the flexible screen 20 is located in the protection cavity.

The display device may further include a battery 30 and a circuit board 40. Each of the battery 30 and the circuit board 40 is located at the side of the support frame 100 facing away from the screen body support surface 100*a* and corresponds to the main body support member 110. The battery 30 can be configured to provide the electric energy for the driving portion 400 of the display device, and the circuit board 40 can be configured to collect, process and analyze data, so as to ensure that the display device can display images normally.

Figure 5:
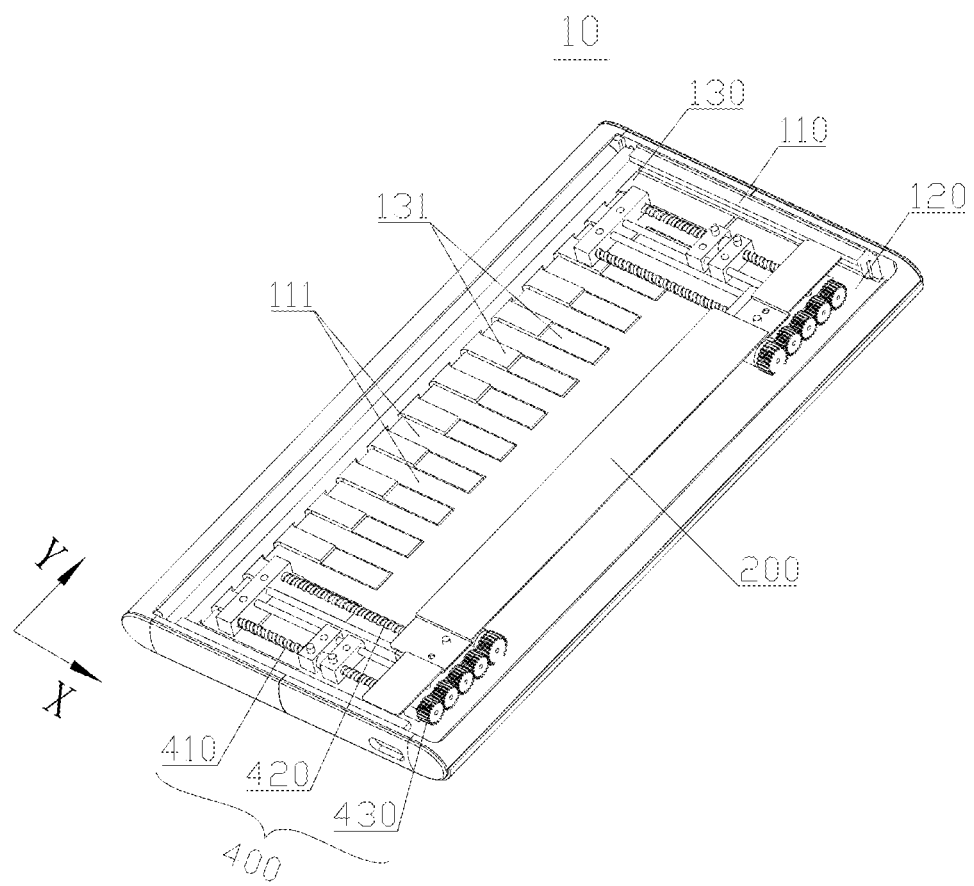
FIG. 5 shows a schematic structural view of a support structural member in a retracting state provided by an embodiment of the present application.
Figure 6:
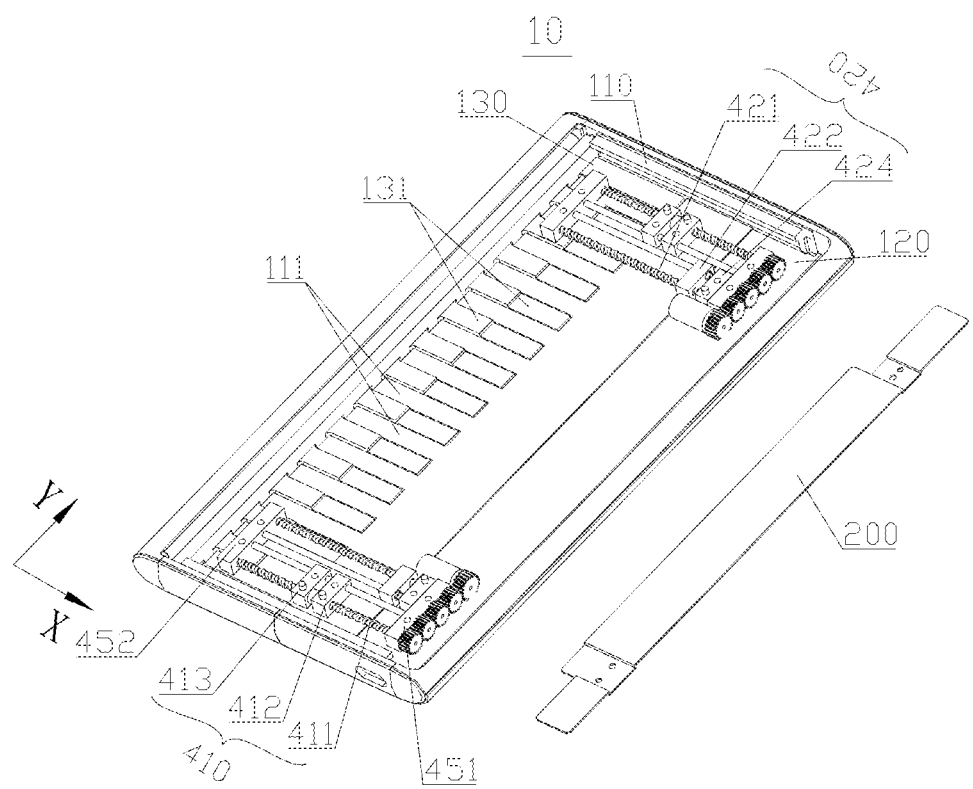
FIG. 6 shows a perspective exploded view of the support structural member shown in FIG. 5.
Figure 7:
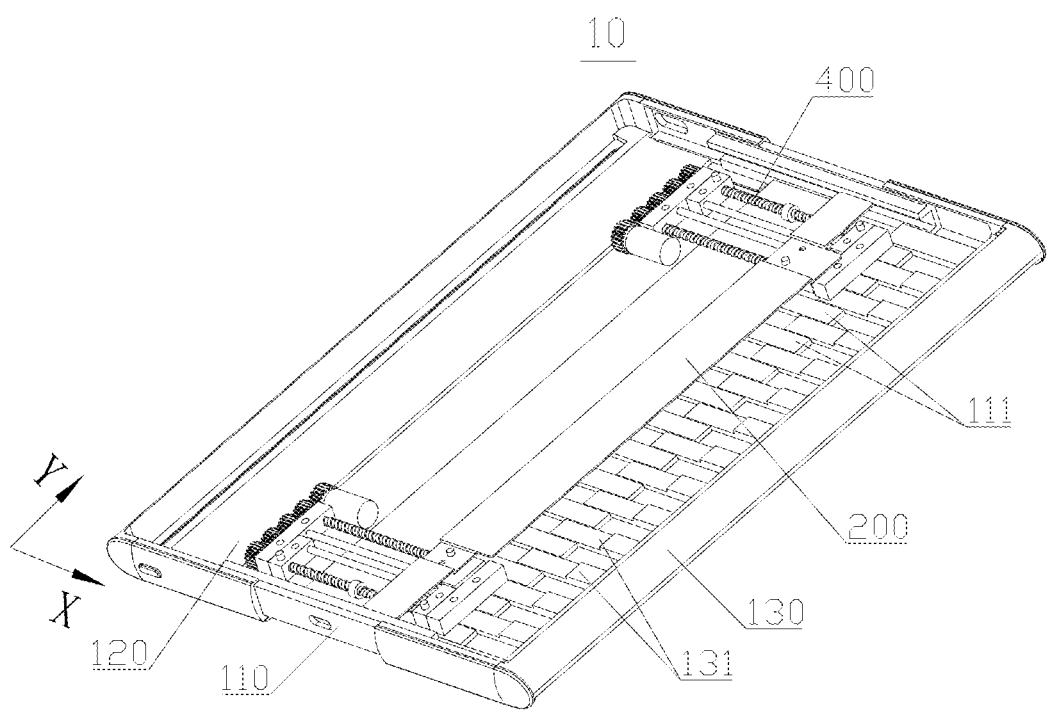
FIG. 7 shows a structural schematic view of the support structural member in an unfolding state shown in FIG. 5.
Figure 8:
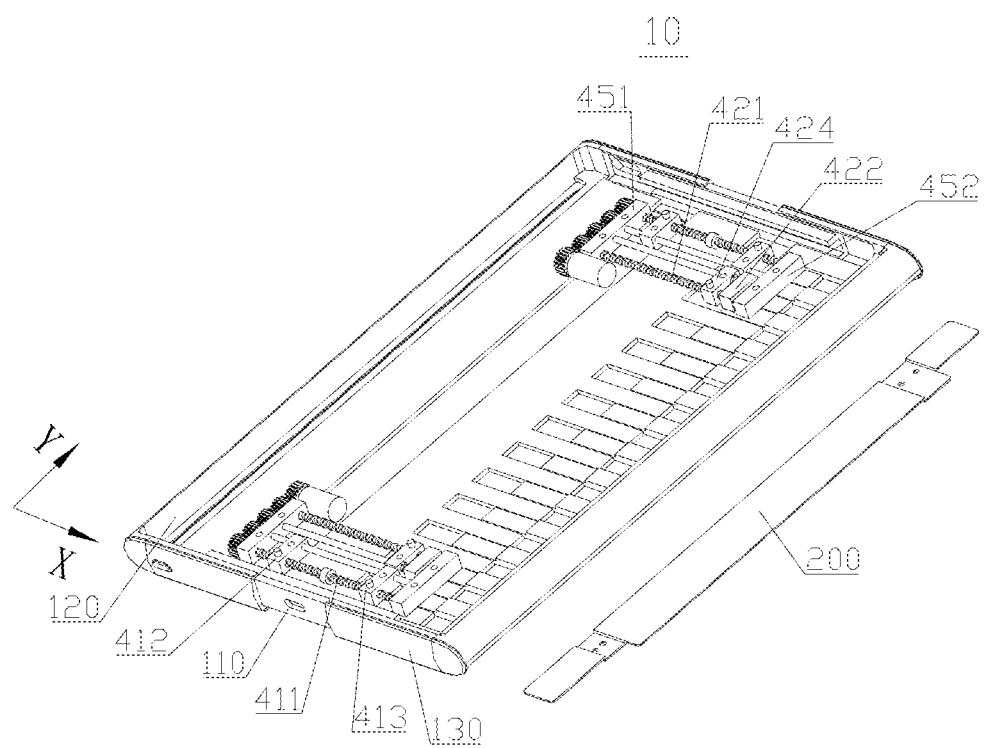
FIG. 8 shows a perspective exploded view of the support structural member shown in FIG. 7.
Figure 9:
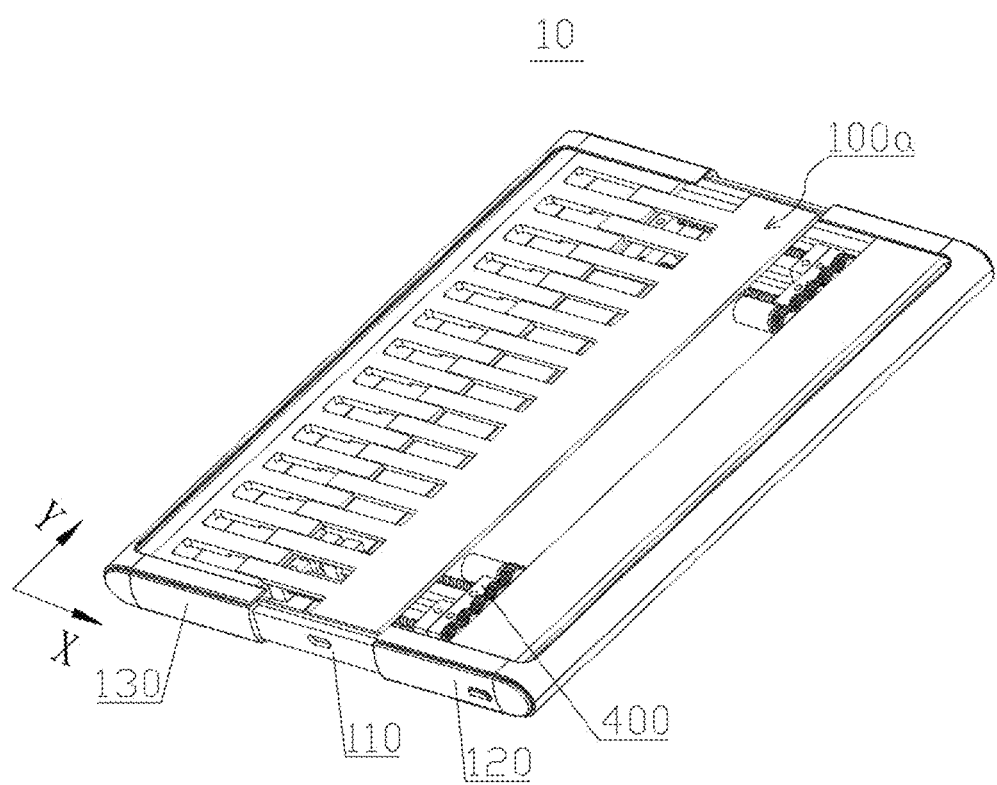
FIG. 9 shows a structural schematic view at another viewing angle of the support structural member in the unfolding state shown in FIG. 7.

FIG. 5 shows a schematic structural view of a support structural member in a retracting state provided by an embodiment of the present application; FIG. 6 shows a perspective exploded view of the support structural member shown in FIG. 5; FIG. 7 shows a structural schematic view of the support structural member in an unfolding state shown in FIG. 5; FIG. 8 shows a perspective exploded view of the support structural member shown in FIG. 7; and FIG. 9 shows a structural schematic view at another viewing angle of the support structural member in the unfolding state shown in FIG. 7.

Referring to FIG. 5 to FIG. 9, in a shrinking state of the support structural member 10, the first sliding support member 120 and the second sliding support member 130 can be stacked with the main body support member 110 in a direction perpendicular to the screen body support surface 100*a*. A size of the support frame 100 in the first direction X is relatively small. In an unfolding state of the support structural member 10, the first sliding support member 120 and the second sliding support member 130 protrude from the main body support member 110 in the first direction X. That is, the first sliding support member 120 and the second sliding support member 130 are far away from each other in the first direction X, and the size of the support frame 100 in the first direction X is relatively large.

Two ends of the main body support member 110 in a second direction Y may be provided with sliding rails extending in the first direction X. Two ends of the first sliding support member 120 in the second direction Y are respectively slidably connected to the sliding rails at two ends of the main body support member 110 in the second direction Y, so that the first sliding support member 120 and the main body support member 110 can be slidably connected. Two ends of the second sliding support member 130 in the second direction Y are respectively slidably connected to the sliding rails at two ends of the main body support member 110 in the second direction Y, so that the movable connection between the second sliding support member 130 and the main body support member 110 can be realized. In order to save space, the main body support member 110 and the second sliding support member 130 can be connected to each other through the insertion among comb teeth. The main body support member 110 may include a plurality of third comb teeth 111, and the second sliding support member 130 may include a plurality of fourth comb teeth 131. The main body support member 110 and the second sliding support member 130 are connected to each other through the insertion between the third comb teeth 111 and the fourth comb teeth 131, that is, each of the third comb teeth 111 is inserted between each two adjacent fourth comb teeth 131, and each of the fourth comb teeth 131 is inserted between each two adjacent third comb teeth 111. In other embodiments, the main body support member 110 and the first sliding support member 120 may also be arranged to be connected through the insertion among comb teeth. Specifically, the main body support member 110 may include a plurality of first comb teeth, and the first sliding support member 120 may include a plurality of second comb teeth. The main body support member 110 and the first sliding support member 120 are connected to each other through the insertion between the first comb teeth and the second comb teeth, that is, each of the first comb teeth is inserted between each two adjacent second comb teeth, and each of the second comb teeth is inserted between each two adjacent first comb teeth, so as to form the screen body support surface 100*a* and improve the flatness of the flexible screen 20.

The screen body support surface 100*a* includes a side surface of the first sliding support member 120 for supporting the flexible screen 20, a side surface of the second sliding support member 130 for supporting the flexible screen 20, and a side surface of the main body support member 110 for supporting the flexible screen 20. When the first sliding support member 120 and the second sliding support member 130 move away from each other in the first direction X, The side surfaces for supporting the flexible screen 20 among the above three side surfaces are coplanar to realize the unfolding of the flexible screen 20 and ensure the flatness of the flexible screen 20. When the first sliding support member 120 and the second sliding support member 130 approach to each other in the first direction X, the screen body support surface 100*a* is formed by the side surface of the main body support member 110 for supporting the flexible screen 20, so as to realize the storage of the flexible screen 20.

The support frame 100 may further include a first roller 140, the first roller 140 is mounted on the end of the second sliding support member 130 away from the first sliding support member 120, the first roller 140 extends in the second direction Y, and the second direction Y may be perpendicular to the first direction X. Two ends of the first roller 140 are rotatably connected to the second sliding support member 130. When the flexible screen 20 is mounted on the support structural member 10, the second end of the flexible screen 20 is wrapped around the first roller 140 and bent towards the side of the support frame 100 facing away from the screen body support surface 100a. The first roller 140 can reduce the resistance of the flexible screen 20 in the unfolding or retracting process, and can also reduce the possibility of frictional damage caused by the direct contact between the flexible screen 20 and the second sliding support member 130.

The support structural member 10 provided by the embodiments of the present application may further include a screen body connecting member. The screen body connecting member is arranged on the side of the support frame 100 facing away from the screen body support surface 100a, and the two ends of the screen body connecting member in the second direction Y are connected to the driving portion 400. The screen body connecting member includes a first screen body connecting member 200 and/or a second screen body connecting member.

Optionally, the screen body connecting member includes the first screen body connecting member 200, and the first screen body connecting member 200 is arranged at the side of the support frame 100 facing away from the screen body support surface 100a. When the flexible screen 20 is mounted on the support structural member 10, the first end of the flexible screen 20 may be connected to the end of the first sliding support member 120 away from the second sliding support member 130, and the second end of the flexible screen 20 can be connected to the first screen body connecting member 200 after being wrapped around the second sliding support member 130 and bent towards the side of the support frame 100 facing away from the screen body support surface 100a.

In order to better support the flexible screen 20, the first screen body connecting member 200 can extend in the second direction, and two ends of the first screen body connecting member 200 in the second direction Y can be connected to the driving portion 400.

In order to facilitate the connection between the flexible screen 20 and the first sliding support member 120, the support structural member 10 may further include a screen body fixing member. The screen body fixing member is connected to the end of the first sliding support member 120 away from the second sliding support member 130. When the flexible screen 20 is mounted on the support structural member 10, the first end of the flexible screen 20 can be connected to the first sliding support member 120 through the screen body fixing member.

Optionally, the screen body connecting member includes the second screen body connecting member, and the second screen body connecting member is arranged at the side of the support frame 100 facing away from the screen body support surface 100a. When the flexible screen 20 is mounted on the support structural member 10, the second end of the flexible screen 20 may be connected to the end of the second sliding support member 130 away from the first sliding support member 120, and the first end of the flexible screen 20 can be connected to the second screen body connecting member after being wrapped around the first sliding support member 120 and bent towards the side of the support frame 100 facing away from the screen body support surface 100a. The second screen body connecting member can extend in the second direction Y, and two ends of the second screen body connecting member in the second direction Y can be connected to the driving portion 400. The support structural member 10 may further include the screen body fixing member, and the screen body fixing member is connected to the end of the second sliding support member 130 away from the first sliding support member 120. When the flexible screen 20 is mounted on the support structural member 10, the second end of the flexible screen 20 may be connected to the second sliding support member 130 through the screen body fixing member.

Optionally, the screen body connecting member includes the first screen body connecting member 200 and the second screen body connecting member. Each of the first screen body connecting member 200 and the second screen body connecting member is arranged at the side of the support frame 100 facing away from the screen body support surface 100a. When the flexible screen 20 is mounted on the support structural member 10, the first end of the flexible screen 20 can be connected to the second end after being wrapped around the first sliding support member 120 and bent towards the side of the support frame 100 facing away from the screen body support surface 100a, and the second end of the flexible screen 20 can be connected to the first screen body connecting member 200 after being wrapped around the second sliding support member 130 and bent towards the side of the support frame 100 facing away from the screen body support surface 100a. The first screen body connecting member 200 may extend in the second direction Y, and two ends of the first screen body connecting member 200 in the second direction Y may be connected to the driving portion 400. The second screen body connecting member can extend in the second direction Y, and two ends of the second screen body connecting member in the second direction Y can be connected to the driving portion 400. When the support frame 100 is stretched or shrunk, the first end and the second end of the flexible screen 20 move simultaneously to realize the unfolding and retraction of the flexible screen 20.

In order to reduce the resistance of the flexible screen 20 in the process of unfolding or retraction, and reduce the possibility of the frictional damage caused by the direct contact between the flexible screen 20 and the first sliding support member 120, a second roller may be mounted at the end of the first sliding support member 120 away from the second sliding support member 130. Two ends of the second roller are rotatably connected to the first sliding support member 120. When the flexible screen 20 is mounted on the support structural member 10, the first end of the flexible screen 20 is wrapped around the second roller connected to the first sliding support member 120 and bent towards the side of the support frame 100 facing away from the screen body support surface 100a.

It can be understood that when the flexible screen 20 is unfolded and retracted through moving the first end and the second end of the flexible screen 20 simultaneously, the support structural member 10 is provided by the embodiment of the present application. The support structural member 10 includes the screen body connecting member. The screen body connecting member may include the first screen body connecting member 200 and the second screen body connecting member. Each of the first screen body connecting member 200 and the second screen body connecting member is arranged at the side of the support frame 100 facing away from the screen body support surface 100a. When the flexible screen 20 is mounted on the support structural member 10, the second end of the flexible screen 20 can be connected to the first screen body connecting member 200 after being wrapped around the second sliding support member 130 and bent towards the side of the support frame 100 facing away from the screen body support surface 100a. The first end of the flexible screen 20 is connected to the second screen body connecting member after being wrapped around the first sliding support member 120 and bent towards the side of the support frame 100 facing away from the screen body support surface 100a.

Figure 10:
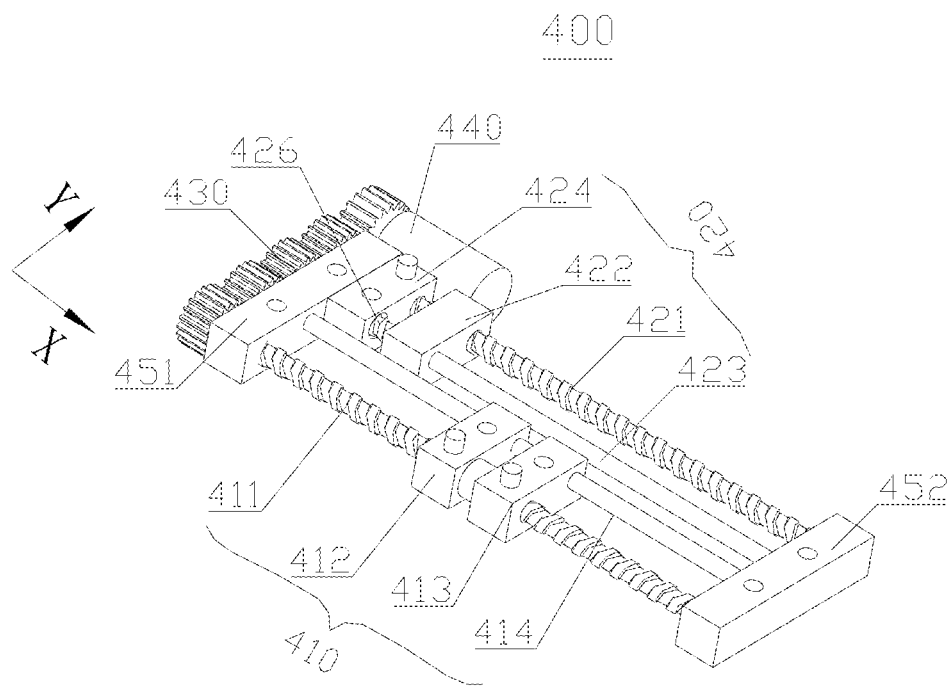
FIG. 10 shows a structural schematic view of a driving portion shown in FIG. 4.
Figure 11:
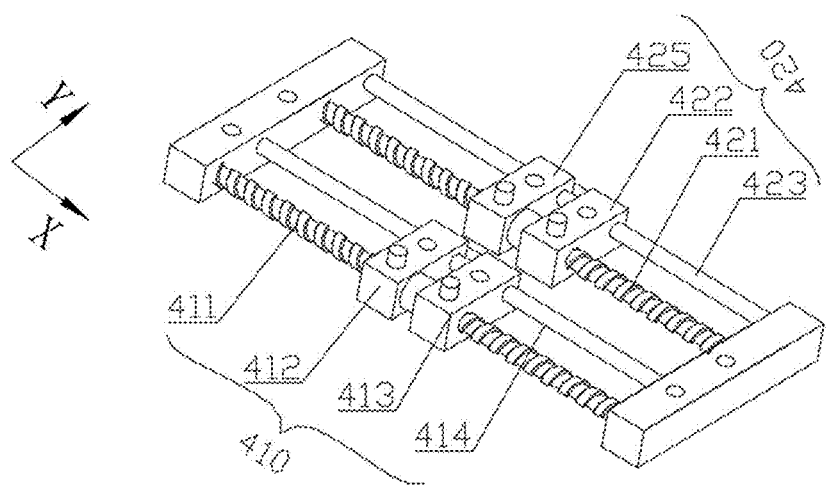
FIG. 11 shows a structural schematic view of another example of a driving portion shown in FIG. 4.

FIG. 10 shows a structural schematic view of the driving portion shown in FIG. 4; and FIG. 11 shows a structural schematic view of another example of the driving portion shown in FIG. 4.

As shown in FIG. 10, the support structural member 10 provided by the embodiments of the present application further includes two driving portions 400. The support frame 100 includes the main body support member 110, and two driving portions 400 are arranged at the side of the support frame 100 facing away from the screen body support surface 100a. Each of the first sliding support member 120 and the second sliding support member 130 are movably connected to the main body support member 110 in the first direction X. Two driving portions 400 are respectively arranged at two ends of each of the first sliding support member 120 and the second sliding support member 130 in the second direction Y, so as to drive the first sliding support member 120 and the second sliding support member 130 to move simultaneously, so that the first sliding support member 120 and the second sliding support member 130 can approach to or move away from each other.

The driving portion 400 includes a first driving mechanism 410, a second driving mechanism and a linkage mechanism 430. The linkage mechanism 430 is connected the first driving mechanism 410 and the second driving mechanism 420. The first sliding support member 120 and the second sliding support member 130 are connected to the first driving mechanism 410. The first driving mechanism 410 is configured to drive the second sliding support member 130 and the first sliding support member 120 to move in the first direction X simultaneously, so that the first sliding support member 120 and the second sliding support member 130 can approach to or move away from each other simultaneously. The second driving mechanism is connected to the first screen body connecting member 200, the first screen body connecting member 200 is connected to the second end of the flexible screen 20, and the second driving mechanism is configured to drive the first screen body connecting member to move, thereby driving the second end of the flexible screen 20 to move.

When the first driving mechanism 410 drives the first sliding support member 120 and the second sliding support member 130 to move in the first direction X simultaneously, the second driving mechanism 420 drives the first screen body connecting member 200 to move in the same direction as the second sliding support member 130 moves through the linkage mechanism 430. In this way, it can avoid the situation that when the second sliding support member 130 moves away from the first sliding support member 120, the first screen body connecting member 200 cannot move (that is, unfolds the flexible screen 20), and it can also avoid the situation that when the second sliding support member 130 has not moved toward the direction approaching to the first sliding support member 120, the first screen body connect-ing member 200 starts to move (that is, retracts the flexible screen 20). Therefore, the possibility that the second driving mechanism exerts an excessive stress on the flexible screen 20 and causes the flexible screen 20 to be stretched excessively and torn can be avoided.

When the first driving mechanism 410 drives the first sliding support member 120 and the second sliding support member 130 to move toward each other (approach to each other) or opposite to each other (away from each other) in the first direction X simultaneously, a moving velocity V1 of the first sliding support member 120 relative to the main body support member 110 and a moving velocity V2 of the second sliding support member 130 relative to the main body support member 110 may be the same or different. Optionally, the moving velocity V1 of the first sliding support member 120 relative to the main body support member 110 is the same as the moving velocity V2 of the second sliding support member 130 relative to the main body support member 110.

In this embodiment, the second driving mechanism 420 is configured to drive the first screen body connecting member 200 and the second sliding support member 130 to move in the same direction.

When the first driving mechanism 410 drives the first sliding support member 120 and the second sliding support member 130 to approach to each other relative to the main body support 110 (that is, the support frame 100 shrinks) or move away from each other relative to the main body support 110 (that is, the support frame 100 unfolds), the second driving mechanism 420 drives the first screen body connecting member 200 to drive the second end of the flexible screen 20 to move in the same direction as the second sliding support member 130 moves, so that a part of the flexible screen 20 switches between the side of the support frame 100 facing away from the screen body support surface 100a and the side where the screen body support surface 100a is located, so as to realize the unfolding or retracting of the flexible screen 20.

In this embodiment, when the flexible screen 20 is mounted on the support structural member 10, the first end of the flexible screen 20 is connected to the first sliding support member 120. The second end of the flexible screen 20 is wrapped around the second sliding support member 130 and bent towards the side of the support frame 100 facing away from the screen body support surface 100a and connected to the first screen body connecting member 200. The first driving mechanism 410 drives the first sliding support member 120 to move relative to the main body support member 110 at a first velocity V1, and drives the second sliding support member 130 to move relative to the main body support member 110 at a second velocity V2. When the second driving mechanism 420 is configured to drive the first screen body connecting member 200 to move relative to the main body support member 110 at a third velocity V3, the relationship among the first velocity V1, the second velocity V2 and the third velocity V3 satisfies a formula: $V3=V1+2V2$.

It can be understood that when the moving velocity V1 of the first sliding support member 120 relative to the main body support 110 is the same as the moving velocity V2 of the second sliding support member 130 relative to the main body support member 110, the moving velocity V3 of the first screen body connecting member 200 relative to the main body support member 110 satisfies the formula: $V3=3V2$.

It can be understood that, within the same period of time, when the first sliding support member 120 moves a first distance L1 relative to the main body support member 110 in the first direction X, and the second sliding support member 130 moves a second distance L2 relative to the main body support member 110 in the first direction X (the first sliding support member 120 and the second sliding support member 130 move in opposite directions relative to the main body support 110 in the first direction X), a moving distance of the first screen body connecting member 200 is L1+2L2, that is, a moving distance of the second end of the flexible screen 20 located at the side of the support frame 100 facing away from the screen body support surface 100a is L1+2L2, so that the flexible screen 20 can be unfolded or retracted synchronously following the stretching or shrinking of the support frame 100, so as to avoid tearing or wrinkling of the flexible screen 20.

Optionally, when the support structural member 10 includes only the second screen body connecting member, the second driving mechanism 420 drives the second screen body connecting member to move in the same direction as the first sliding support member 120 moves through the linkage mechanism 430. The second screen body connecting member can be connected to the second driving mechanism 420, and the second driving mechanism 420 is configured to drive the second screen body connecting member to move in the same direction as the first sliding support member 120 moves. When the support frame 100 stretches or shrinks, the second driving mechanism 420 drives the second screen body connecting member to drive the first end of the flexible screen 20 to move in the same direction as the first sliding support member 120 moves, so as to realize the unfolding or retracting of the flexible screen 20.

When the first driving mechanism 410 drives the first sliding support member 120 to move relative to the main body support 110 at the first velocity V1 and drives the second sliding support member 130 to move relative to the main body support member 110 at the second velocity V2, and the second driving mechanism 420 drives the second screen body connecting member to move relative to the main body support member 110 at a fourth velocity V4, the relationship among the first velocity V1, the second velocity V2 and the fourth velocity V4 satisfies a formula: V4=2V1+V2.

It can be understood that when the moving velocity V1 of the first sliding support member 120 relative to the main body support member 110 is the same as the moving velocity V2 of the second sliding support member 130 relative to the main body support member 110, the moving velocity V4 of the first screen body connecting member 200 relative to the main body support member 110 satisfies the formula: V4=3V1.

It can be understood that, within the same period of time, when the first sliding support member 120 moves the first distance L1 relative to the main body support member 110 in the first direction X, and the second sliding support member 130 moves the second distance L2 relative to the main body support member 110 in the first direction X (the first sliding support member 120 and the second sliding support member 130 move in opposite directions relative to the main body support 110 in the first direction X), the moving distance of the second screen body connecting member 200 is L1+2L2, that is, the moving distance of the first end of the flexible screen 20 located at the side of the support frame 100 facing away from the screen body support surface 100a is 2L1+L2, so that the flexible screen 20 can be unfolded or retracted synchronously following the stretching or shrinking of the support frame 100, so as to avoid tearing or wrinkling of the flexible screen 20.

Optionally, when the support structural member 10 includes the first screen body connecting member 200 and the second screen body connecting member, the second driving mechanism 420 drives the first screen body connecting member 200 to move in the same direction as the second sliding support member 130 moves through the linkage mechanism 430, and the second driving mechanism 420 drives the second screen body connecting member to move in the same direction as the first sliding support member 120 moves through the linkage mechanism 430. Each of the first screen body connecting member 200 and the second screen body connecting member can be connected to the second driving mechanism 420, and the second driving mechanism 420 is configured to drive the first screen body connecting member 200 to move in the same direction as the second sliding support member 130 moves and to drive the second screen body connecting member to move in the same direction as the first sliding support member 120 moves.

When the first driving mechanism 410 drives the first sliding support member 120 and the second sliding support member 130 to approach to or move away from each other (that is, the support frame 100 stretches and shrinks) relative to the main body support member 110 simultaneously, the second driving mechanism 420 drives the first screen body connecting member 200 to move in the same direction as the second sliding support member 130 moves simultaneously, and drives the second screen body connecting member to move in the same direction as the first sliding support member 120 moves simultaneously, so that a part of the flexible screen 20 can switch between the side of the support frame 100 facing away from the screen body support surface 100a and the side where the screen body support surface 100a is located, so as to realize the unfolding or retracting of the flexible screen 20.

When the flexible screen 20 is mounted on the support structural member 10, the second end of the flexible screen 20 is wrapped and bent around the second sliding support member 130 and then connected to the first screen body connecting member 200, and the first end of the flexible screen 20 is wrapped and bent around the first sliding support member 120 and then connected to the second screen body connecting member. The first driving mechanism 410 drives the first sliding support member 120 to move relative to the main body support member 110 at the first velocity V1, and drives the second sliding support member 130 to move relative to the main body support member 110 at the second velocity V2. The second driving mechanism 420 drives the first screen body connecting member 200 to move relative to the main body support member 110 at the third velocity V3, and drives the second screen body connecting member to move relative to the main body support member 110 at the fourth velocity V4. The relationship among the first velocity V1, the second velocity V2, the third velocity V3 and the fourth velocity V4 satisfies the formula: V3+V4=2(V1+V2).

It can be understood that when the moving velocity V1 of the first sliding support member 120 relative to the main body support member 110 is the same as the moving velocity V2 of the second sliding support member 130 relative to the main body support member 110. When the moving velocity V3 of the first screen body connecting member 200 relative to the main body support member 110 is the same as the moving velocity V4 of the second screen body connecting member 200 relative to the main body support member 110, the relationship among the first velocity V1, the second velocity V2, the third velocity V3 and the fourth velocity V4 satisfies the formula: V3=V4=2V1=2V2.

It can be understood that, within the same period of time, when the first sliding support member 120 moves the first distance L1 relative to the main body support member 110 in the first direction X, and the second sliding support member 130 moves the second distance L2 relative to the main body support member 110 in the first direction X (the first sliding support member 120 and the second sliding support member 130 move in opposite directions relative to the main body support 110 in the first direction X), a sum of the moving distances of the first screen body connecting member 200 and the second screen body connecting member is 2(L1+L2), that is, a total moving distance of the first end and the second end of the flexible screen 20 is 2(L1+L2), so that the flexible screen 20 can be unfolded or retracted synchronously following the stretching or shrinking of the support frame 100, so as to avoid tearing or wrinkling of the flexible screen 20.

There are various specific structures of the first driving mechanism 410 and the second driving mechanism 420. There is an example that the first end of the flexible screen 20 is connected to the first sliding support member 120, and the second end of the flexible screen 20 is wrapped around the second sliding support member 130 and bent towards the side of the support frame 100 facing away from the screen body support surface 100a, so as to describe the specific structures of the first driving mechanism 410 and the second driving mechanism 420.

Please continue to refer to FIG. 5 to FIG. 9, combined with FIG. 10, the first driving mechanism 410 may include a first threaded rod 411, a first sliding block 412 and a second sliding block 413. The first threaded rod 411 is rotatably connected to the main body support member 110, the first threaded rod 411 includes a first segment and a second segment with opposite threaded helical directions, and an extending direction of the first threaded rod 411 may be parallel to the first direction X. The first sliding block 412 is threadedly connected to the first segment of the first threaded rod 411, and the first sliding support member 120 is connected to the first sliding block 412. The second sliding block 413 is threadedly connected to the second segment of the first threaded rod 411, and the second sliding support member 130 is connected to the second sliding block 413.

Since threads of the first segment and second segment have opposite threaded helical directions, when the first threaded rod 411 rotates around its own axis relative to the main body support member 110, the first sliding block 412 and the second sliding block 413 can move toward each other (approach to each other) or move opposite to each other (move away from each other) along the first threaded rod 411 simultaneously, so that the first sliding support member 120 and the second sliding support member 130 move toward each other (approach to each other) or move opposite to each other (move away from each other) in the first direction X simultaneously. A bi-directional threaded-rod-sliding-block structure can be selected, which can be easy to ensure that the first sliding support member 120 and the second sliding support member 130 move towards each other or opposite to each other simultaneously.

Optionally, in order to make the moving velocity of the first sliding support member 120 relative to the main body support member 110 same as the moving velocity of the second sliding support member 130 relative to the main body support 110, a thread pitch of the first segment of the first threaded rod 411 is the same as a thread pitch of the second segment of the first threaded rod 411.

Optionally, the second driving mechanism 420 may include a second threaded rod 421 and a third sliding block 422. The second threaded rod 421 is rotatably connected to the main body support member 110. An extending direction of the second threaded rod 421 can be parallel to the first direction X. The third sliding block 422 is threadedly connected to the second threaded rod 421. The first screen body connecting member 200 is connected to the third sliding block 422. When the second threaded rod 421 rotates relative to the main body support member 110, the second threaded rod 421 can drive the third sliding block 422 to move in the first direction X, and then drive the first screen body connecting member 200 to move in the first direction X.

In order to enable the first screen body connecting member 200 to move in the same direction as the second sliding support member 130 moves, it is necessary to make the third sliding block 422 move in the same direction as the second sliding block 413 moves. Optionally, a rotation direction of the second threaded rod 421 can be arranged to be the same as a rotation direction of the first threaded rod 411, and a threaded helical direction of the second threaded rod 421 is the same as a threaded helical direction of the second segment of the first threaded rod 411; or a rotation direction of the second threaded rod 421 can be arranged to be opposite to a rotation direction of the first threaded rod 411, and a threaded helical direction of the second threaded rod 421 is opposite to a threaded helical direction of the second segment of the first threaded rod 411.

Certainly, the specific structures of the first driving mechanism 410 and the second driving mechanism 420 are not limited thereto. The first driving mechanism 410 and the second driving mechanism 420 can also be linear motors, hydraulic cylinders and other driving mechanisms, which are also within the protection scope of the present application.

In some optional embodiments, in order to make the moving velocity of the first screen body connecting member 200 relative to the main body support member 110 may satisfy the formula: $V3=V1+2V2$, in the case that the first driving mechanism 410 and the second driving mechanism 420 adopt the threaded-rod-sliding-block structures, the rotation speed of the second threaded rod 421 can be arranged to be the same as the rotation speed of the first threaded rod 411, and the thread pitch of the second threaded rod 421 may satisfy the formula: $P2=P11+2P12$. Herein, P2 is the thread pitch of the second threaded rod 421, P11 is the thread pitch of the first segment of the first threaded rod 411, and P12 is the thread pitch of the second segment of the first threaded rod 411.

When the thread pitch of the first segment of the first threaded rod 411 is the same as the thread pitch of the second segment, the thread pitch of the second threaded rod 421 is three times the thread pitch of the first threaded rod 411.

In some other optional embodiments, the thread pitches of the first segment and the second segment of the first screw 411 can be arranged to be the same as the thread pitch of the second threaded rod 421, and the rotation speed of the second threaded rod 421 can be arranged to 3 times of the rotation speed of the first threaded rod 411, so that the flexible screen 20 can be unfolded or retracted synchronously following the stretching or shrinking of the support frame 100, which can be also within the protection scope of the present application.

The first driving mechanism 410 may further include a first guiding rail 414, an extending direction of the first guiding rail 414 may be parallel to the first direction X, and the first sliding block 412 and the second sliding block 413 are movably connected to the first guiding rail 414. When the first threaded rod 411 rotates around its own axis, the first sliding block 412 and the second sliding block 413 simultaneously move towards each other or away from each other, and the first guiding rail 414 can guide the first sliding block 412 and the second sliding block 413 to move.

The second driving mechanism 420 may further include a second guiding rail 423, an extending direction of the second guiding rail 423 may be parallel to the first direction X, and the third sliding block 422 is movably connected to the second guiding rail 423. When the second threaded rod 421 rotates relative to the main body support member 110, the second threaded rod 421 can drive the third sliding block 422 to move in the first direction X. and the second guiding rail 423 can guide the third sliding block 422 to move.

Optionally, the first threaded rod 411 and the first guiding rail 414 may be adjacently arranged in the second direction Y, and the second threaded rod 421 and the second guiding rail 423 may be adjacently arranged in the second direction Y.

The first guiding rail 414 and the second guiding rail 423 can be provided as slide rods, or can be provided as standard sliding rails, which are not specifically limited in the present application.

Referring to FIG. 5 to FIG. 10, in order to facilitate mounting the first driving mechanism 410 and the second driving mechanism 420, the driving portion 400 may further include a first mounting base 451 and a second mounting base 452, and the first mounting base 451 and the second mounting base 452 can be arranged on the main body support member 110 and to be spaced from each other in the first direction X. Each of the first mounting base 451 and the second mounting base 452 may be detachably connected to the main body support member 110. Each of the first threaded rod 411 and the second threaded rod 421 can be rotatably connected to the first mounting base 451 and the second mounting base 452. Each of the first guiding rail 414 and the second guiding rail 423 are connected to the first mounting base 451 and the second mounting base 452.

A distance between the first mounting base 451 and the second mounting base 452 in the first direction X can limit a maximum movement amounts of the first sliding support member 120, the second sliding support member 130 and the first screen body connecting member 200.

Optionally, the first mounting base 451 is located at a side of the first sliding support member 120, and the second mounting base 452 is located at a side of the second sliding support member 130. As shown in FIG. 5 and FIG. 6, in the storage state of the support structural member 10, the first sliding block 412 and the second sliding block 413 are located at a middle position of the first threaded rod 411, and the first screen body connecting member 200 and the third sliding block 422 are located at an end of the second threaded rod 421 close to the first mounting base 451, that is, the first screen body connecting member 200 and the third sliding block 422 are located at an end of the second threaded rod 421 close to the first sliding support member 120. As shown in FIG. 7 and FIG. 8, in the unfolding state of the support structural member 10, the first sliding block 412 moves to an end of the first threaded rod 411 close to the first sliding support member 120, the second sliding block 413 moves to an end of the first threaded rod 411 close to the second sliding support member 130, and the first screen body connecting member 200 and the third sliding block 422 move to an end of the second threaded rod 421 close to the second sliding support member 130.

The second driving mechanism 420 may further include a tension mechanism for tensioning the flexible screen to be connected on the screen body connecting member.

Optionally, when the screen body connecting member includes the first screen body connecting member 200, the tension mechanism connects the third sliding block 422 and the first screen body connecting member 200, and the tension mechanism is configured to apply a tension force in the first direction X to the screen body connecting member. When the flexible screen 20 is mounted on the support structural member 10, the second end of the flexible screen 20 is connected to the first screen body connecting member 200. According to arranging the tension mechanism, it can keep the flexible screen 20 always in a tensioned and flat state during the stretching process of the support structural member 10, thereby improving the display effect.

Optionally, the tension mechanism may include a first elastic member 426 and a first connecting base 424. The first connecting base 424 is movably connected to the second threaded rod 421, the first screen body connecting member 200 is connected to the first connecting base 424, one end of the first elastic member 426 is connected to the first connecting base 424, the other end of the first elastic member 426 is connected to the third sliding block 422, and the first elastic member 426 exerts the tension force in the first direction X to the first connecting base 424.

When the support structural member 10 stretches or shrinks, the second threaded rod 421 rotates and drives the third sliding block 422 to move in the first direction X, and the third sliding block 422 drives the first connecting base 424 and the first screen body connecting member 200 to move through the first elastic member 426, thereby realizing the movement of the first screen body connecting member 200 and the second end of the flexible screen 20, and realizing the unfolding or storage of the flexible screen 20.

The tension mechanism can be provided as an elastic tension mechanism. The first connecting base 424 and the third sliding block 422 are connected through the first elastic member 426, and the first screen body connecting member 200 is connected to the first connecting base 424. Therefore, the tension of the flexible screen 20 can be realized, and the rigid connection between the flexible screen 20 and the third sliding block 422 can be avoided.

In order to keep the flexible screen 20 in a tensioned and flat state all the time, a direction of the tension force applied by the first elastic member 426 to the first connecting base 424 remains unchanged during the stretching-and-shrinking process of the support structural member 10. When the second sliding support member 130 moves away from the first sliding support member 120 to stretch the support structural member 10, the direction of the tension force is opposite to a moving direction of the second sliding support member 130; when the second sliding support member 130 moves toward the direction close to the first sliding support member 120 to shrink the support structural member 10, the direction of the tension force is the same as the moving direction of the second sliding support member 130.

The first connecting base 424 is movably connected to the second threaded rod 421. Optionally, the first connecting base 424 may be located at the side of the third sliding block 422 away from the second sliding support member 130, and the first elastic member 426 is in a compressed state at this time. Optionally, the first elastic member 426 may be a spring. Of course, the first connecting base 424 can also be arranged at the side of the third sliding block 422 facing the second sliding support member 130, and the first elastic member 426 is in a stretching state at this time, this situation is also within the protection scope of the present application.

The linkage mechanism 430 connects with the first driving mechanism 410 and the second driving mechanism 420, and the linkage mechanism 430 can enable the first threaded rod 411 and the second threaded rod 421 to rotate simultaneously, so as to easily ensure the first screen body connecting member 200 and the second sliding support member 130 to move simultaneously.

There are various structures of the linkage mechanism 430. In some optional embodiments, the linkage mechanism 430 can be provided as a gear set, and the first threaded rod 411 and the second threaded rod 421 are connected through the gear set. The gear set includes a plurality of gears that mesh with one another. Two of the plurality of gears can be referred to as a first gear and a second gear, respectively. Herein, the first gear is connected to an end of the first threaded rod 411, and the second gear is connected to an end of the second threaded rod 421. A rotation speed ratio between the first threaded rod 411 and the second threaded rod 421 can be adjusted by adjusting a transmitting ratio of the gear set.

The driving portion 400 may further include a driving motor 440. The driving motor 440 is configured to drive the first threaded rod 411 and the second threaded rod 421 to rotate. The driving motor 440 may be a servo motor or a stepping motor or the like. The driving motor 440 can be connected with the first threaded rod 411 and the second threaded rod 421 through the linkage mechanism 430.

In the case that the linkage mechanism 430 is provided as the gear set, three gears in the gear set are respectively recorded as a first gear, a second gear and a third gear. Herein, the first gear is connected to an end of the first threaded rod 411, the second gear is connected to an end of the second threaded rod 421, and the third gear is connected to a motor shaft of the driving motor 440.

Certainly, the specific structure of the linkage mechanism 430 is not limited thereto. The first driving mechanism 410 and the second driving mechanism 420 may also realize the linkage through a mechanism such as a synchronous belt, a synchronous transmitting chain or the like, which can be also within the protection scope of the present application.

There are various numbers of the arrangement of the driving portion 400. In some optional embodiments, the driving portion 400 may be provided as a group. A group of driving portions 400 drive the first sliding support member 120, the second sliding support member 130 and the first screen body connecting member 200 to move.

In other optional embodiments, two or more groups of driving portions 400 may be provided, and the two or more groups of driving portions 400 are arranged to be spaced from one another in the second direction Y. Different parts of the first sliding support member 120, the second sliding support member 130 and the first screen body connecting member 200 in the second direction Y can be driven by a plurality of groups of driving portions 400, thus, on one hand, it can ensure the force balance between the sliding support member and the first screen body connecting member 200, on the other hand, the driving portions 400 can apply a relatively small force to push the sliding support member and the first screen body connecting member 200 to move.

For example, the driving portions 400 can be divided into two groups. The two groups of driving portions 400 can be distributed to be spaced from each other in the second direction Y, and the two groups of driving portions 400 are distributed symmetrically with respect to the axis of the support frame 100 extending in the first direction X. The driving motors 440 of the two groups of driving portions 400 can be synchronously controlled, so that the two groups of driving portions 400 can synchronously drive the sliding support member and the first screen body connecting member 200 to move.

In other optional embodiments, there is an example that the second end of the flexible screen 20 is connected to the second sliding support member 130, and the first end of the flexible screen 20 is wrapped around the first sliding support member 120, bent towards the side of the support frame 100 facing away from the screen body support surface 100a, and connected to the second screen body connecting member. The specific structures of the first driving mechanism 410 and the second driving mechanism 420 may refer to the same structures in the above-mentioned embodiments. The differences of the structures are that the second screen body connecting member is connected to the third sliding block 422 of the second driving mechanism 420 and the third sliding block 422 moves in the same direction as the first sliding block 412 of the first driving mechanism 410 moves.

The linkage mechanism 430 connects with the first driving mechanism 410 and the second driving mechanism 420, and the linkage mechanism 430 can enable the first threaded rod 411 and the second threaded rod 421 to rotate simultaneously, so as to ensure that the second screen body connecting member and the first sliding support member 120 move simultaneously.

In other optional embodiments, in order to make the moving velocity of the second screen body connecting member relative to the main body support member 110 satisfy the formula: V4=2V1+V2, in the case that the first driving mechanism 410 and the second driving mechanism 420 adopt the threaded-rod-sliding-block structures, the rotation speed of the second threaded rod 421 can be arranged to be the same as the rotation speed of the first threaded rod 411, and the thread pitch of the second threaded rod 421 may satisfy the formula: P2=2P11+P12. Herein, P2 is the thread pitch of the second threaded rod 421, P11 is the thread pitch of the first segment of the first threaded rod 411, and P12 is the thread pitch of the second segment of the first threaded rod 411.

When a size of the thread pitch of the first segment of the first threaded rod 411 is a size of the thread pitch of the second segment of the first threaded rod 411, the thread pitch of the second threaded rod 421 is three times the thread pitch of the first threaded rod 411.

Certainly, the thread pitches of the first segment and the second segment of the first threaded rod 411 can be arranged to be same as the thread pitch of the second threaded rod 421, at the same time, the rotation speed of the second threaded rod 421 can be arranged to be as three times the rotation speed of the threaded rod 411, so that the flexible screen 20 can be unfolded or retracted synchronously following the stretching and shrinking of the support frame 100, and it is also within the protection scope of the present application.

Optionally, the second end of the flexible screen 20 is connected to the second sliding support member 130. When the first end is wrapped around the first sliding support member 120, bent towards the side of the support frame 100 facing away from the screen body support surface 100a and connected to the second screen body connecting member, the second driving mechanism 420 may include a tension mechanism. The specific structure and the connection relationship of the tension mechanism can be the same as those as described in the above embodiments. The differences are that: when the second screen body connecting member is connected to the first connecting base 424, and the first sliding support member 120 moves away from the second sliding support member 130 to enable the support structural member 10 to stretch, the direction of tension force applied on the first connecting base 424 by the first elastic member 426 is opposite to the moving direction of the first sliding support member 120; when the first sliding support member 120 moves toward the direction close to the second sliding support member 130 to shrink the support structural member 10, the direction of the tension force applied on the first connecting base 424 by the first elastic member 426 is the same as the moving direction of the first sliding support member 120, so that the flexible screen 20 always maintains the tensioned and flat state during the stretching-and-shrinking process of the support structural member 10.

In other optional embodiments, there is an example that the first end of the flexible screen 20 is wrapped and bent around the first sliding support member 120 and then connected to the second screen body connecting member, and the second end of the flexible screen 20 is wrapped and bent around the second sliding support member 130 and then connected to the first screen body connecting member 200. The specific structures of the first driving mechanism 410 and the second driving mechanism 420 may be the same as the structures in the above-mentioned embodiments. It is only necessary to change the specific structure of the second driving mechanism 420, and design the structure of the second driving mechanism 420 to be the same as structure of the first driving mechanism 410. As shown in FIG. 11, the second driving mechanism 420 may include a second threaded rod 421, a third sliding block 422 and a fourth sliding block 425. When the second threaded rod 421 includes a first segment and a second segment with opposite threaded helical directions, the third sliding block 422 is threadedly connected with the first segment of the second threaded rod 421, the fourth sliding block 425 is threadedly connected with the second segment of the second threaded rod 421, and the second threaded rod 421 rotates relative to the main body support 110, the second driving mechanism 420 drives the third sliding block 422 and the fourth sliding block 425 to move toward each other (approach to each other) or move opposite to each other (move away from each other) in the first direction X simultaneously.

The first screen body connecting member 200 is connected to the third sliding block 422, and the second screen body connecting member is connected to the fourth sliding block 425, so that it can realize that the first screen body connecting member 200 and the second screen body connecting member are displaced toward each other (approach to each other) or opposite to each other (move away from each other) simultaneously.

Specifically, the linkage mechanism 430 connects with the first driving mechanism 410 and the second driving mechanism 420, and the linkage mechanism 430 enable the first threaded rod 411 and the second threaded rod 421 to rotate simultaneously, so that it can easily ensure that the first screen body connecting member 200 and the second sliding support member 130 move simultaneously, and the second screen body connecting member and the first sliding support member 120 move simultaneously.

In other optional embodiments, in order to make the moving velocities of the first screen body connecting member 200 and the second screen body connecting member relative to the main body support member 110 satisfy the formula: V3+V4=2(V1+V2), in the case that the first driving mechanism 410 and the second driving mechanism 420 adopt the threaded-rod-sliding-block structures, the rotation speed of the second threaded rod 421 can be arranged to be the same as the rotation speed of the first threaded rod 411, and the thread pitch of the second threaded rod 421 may satisfy the formula: P21+P22=2(P11+P12). Herein, P21 is the thread pitch of the first segment of the second threaded rod 421, P22 is the thread pitch of the second segment of the second threaded rod 421, and P12 is the thread pitch of the second segment of the first threaded rod 411.

When the thread pitch of the first segment of the first threaded rod 411 is the same as the thread pitch of the second segment of the first threaded rod 411, and the thread pitch of the first segment of the second threaded rod 421 is the same as the thread pitch of the second segment of the second threaded rod 421, the thread pitch of the second threaded rod 421 is two times the thread pitch of the first threaded rod 411, and P21=P22=2P11=2P12.

Certainly, the thread pitch of the first threaded rod 411 can also be arranged to be the same as the thread pitch of the second threaded rod 421, at the same time, the rotation speed of the second threaded rod 421 can be arranged to be as two times the rotation speed of the threaded rod 411, so that the flexible screen 20 can be unfolded or retracted synchronously following the stretching and shrinking of the support frame 100, and it is also within the protection scope of the present application.

Optionally, in the case that the first end of the flexible screen 20 is wrapped and bent around the first sliding support member 120 and then connected to second screen body connecting member, the second end of the flexible screen 20 is wrapped and bent around the second sliding support member 130 and then connected to first screen body connecting member 200, and the second driving mechanism 420 includes the tension mechanism, the tensioning mechanism may include the first elastic member, the first connecting base 424, a second elastic member and a second connecting base. The first connecting base 424 is movably connected to the first segment of the second threaded rod 421, and the first screen body connecting member 200 is connected to the first connecting base 424; one end of the first elastic member is connected to the first connecting base 424, and the other end of the first elastic member is connected to the third sliding block 422; the second body connecting base is movably connected to the second segment of the second threaded rod 421, and the second screen body connecting member is connected to the second connecting base; one end of the second elastic member is connected to the second connecting base, and the other end of the second elastic member is connected to the fourth sliding block 425, so that the first elastic member exerts the tension force to the first connecting base 424 in the first direction X, and the second elastic member exerts the tension force to the second connecting base in the first direction X.

When the support structural member 10 stretches or shrinks, the second threaded rod 421 rotates and drives the third sliding block 422 and the fourth sliding block 422 to move towards each other (approach to each other) or opposite to each other (move away from each other) in the first direction X, the third sliding block 422 drives the first connecting base 424 and the first screen body connecting member 200 to move through the first elastic member, and the fourth sliding block 425 drives the second connecting base and the second screen body connecting member to move through the second elastic member, thereby realizing the second end and the first end of the flexible screen 20 moving toward each other (approach to each other) or opposite to each other (move away from each other) simultaneously, and realizing the unfolding or storage of the flexible screen 20.

In accordance with the embodiments of the present application as described above, these embodiments do not describe all details in detail, nor do they limit the present application to the specific embodiments described only. It is apparent that various modifications and variations can be made in light of the above description. The description provides and specifically describes these embodiments in order to better explain the principles and practical applications of the present application, so that those skilled in the art can make good use of the present application and modifications thereof based on the present application. The present application is to be limited only by the claims, along with their full scope and equivalents.

What is claimed is:

1. A support structural member for a display device, comprising:
    a support frame, comprising a screen body support surface, wherein the support frame comprises a first sliding support member and a second sliding support member arranged opposite to each other, and the first sliding support member and the second sliding support member are movably connected in a first direction;
    a screen body connecting member; and
    a driving portion, comprising a first driving mechanism and a second driving mechanism, wherein the first driving mechanism is configured to drive the first sliding support member and the second sliding support member to move relative to each other in the first direction to drive the first sliding support member and the second sliding support member to approach or withdraw from each other, the second driving mechanism is configured to drive the screen body connecting member, and a linkage mechanism connects the first driving mechanism with the second driving mechanism;
    wherein the driving portion is arranged at a side of the support frame facing away from the screen body support surface, and the support frame further comprises:
    a main body support member, each of the first sliding support member and the second sliding support member is movably connected to the main body support member in the first direction, and the first driving mechanism is configured to drive the first sliding support member and the second sliding support member to simultaneously move relative to the main body support member.

2. The support structural member according to claim 1, wherein the screen body connecting member is arranged at the side of the support frame facing away from the screen body support surface, and the second driving mechanism is configured to:
    drive the screen body connecting member to move in a same direction as the second sliding support member moves,
    drive the screen body connecting member to move in a same direction as the first sliding support member moves, or
    drive the screen body connecting member to move in a same direction as both the second sliding support member and the first sliding support member move.

3. The support structural member according to claim 2, wherein the screen body connecting member further comprises:

a first screen body connecting member, and the second driving mechanism is configured to drive the first screen body connecting member to move in the same direction as the second sliding support member moves.

4. The support structural member according to claim 3, wherein the first driving mechanism is configured to:
    drive the first sliding support member to move relative to the main body support member at a first velocity V1; and
    drive the second sliding support member to move relative to the main body support member at a second velocity V2, and the second driving mechanism is configured to drive the first screen body connecting member to move relative to the main body support member at a third velocity V3, and V3=V1+2V2.

5. The support structural member according to claim 2, wherein the screen body connecting member further comprises:
    a second screen body connecting member configured to drive the second screen body connecting member to move in the same direction as the first sliding support member moves.

6. The support structural member according to claim 5, wherein the first driving mechanism is configured to:
    drive the first sliding support member to move relative to the main body support member at a first velocity V1; and
    drive the second sliding support member to move relative to the main body support member at a second velocity V2, and the second driving mechanism is configured to drive the second screen body connecting member to move relative to the main body support member at a fourth velocity V4, and V4=2V1+V2.

7. The support structural member according to claim 2, wherein the screen body connecting member further comprises:
    a first screen body connecting member and a second screen body connecting member, and the second driving mechanism is configured to:
    drive the first screen body connecting member to move in the same direction as the second sliding support member; and
    drive the second screen body connecting member to move in the same direction as the first sliding support member moves.

8. The support structural member according to claim 7, wherein the first driving mechanism is configured to:
    drive the first sliding support member to move relative to the main body support member at a first velocity V1; and
    drive the second sliding support member to move relative to the main body support member at a second velocity V2, and the second driving mechanism is configured to drive the first screen body connecting member to move relative to the main body support member at a third velocity V3; and
    drive the second screen body connecting member to move relative to the main body support member at a fourth velocity V4, and V3+V4=2(V1+V2).

9. The support structural member according to claim 7, wherein the linkage mechanism configured to:
    drive the second driving mechanism to move the first screen body connecting member in the same direction as the second sliding support member moves when the first driving mechanism drives the second sliding support member to move; and drive the second driving mechanism to move the second screen body connecting member in the same direction as the first sliding support member moves when the first driving mechanism drives the first sliding support member to move.

10. The support structural member according to claim 2, wherein the first driving mechanism further comprises:
a first threaded rod, a first sliding block and a second sliding block, the first threaded rod is rotatably connected to the main body support member, the first threaded rod comprises a first segment and a second segment with opposite threaded helical directions, the first sliding block is threadedly connected to the first segment of the first threaded rod, the first sliding support member is connected to the first sliding block, the second sliding block is threadedly connected to the second segment of the first threaded rod, the second sliding support member is connected to the second sliding block, and the first threaded rod drives the first sliding block and the second sliding block to move in the first direction when the first threaded rod rotates relative to the main body support member.

11. The support structural member according to claim 10, wherein the second driving mechanism further comprises:
a second threaded rod and a third sliding block, the second threaded rod is rotatably connected to the main body support member, the third sliding block is threadedly connected to the second threaded rod, the screen body connecting member is connected to the third sliding block, and the second threaded rod drives the third sliding block to move in the first direction when the second threaded rod rotates relative to the main body support member.

12. The support structural member according to claim 11, wherein the second threaded rod further comprises:
a first segment and a second segment with opposite threaded helical directions, the second driving mechanism further comprises:
a fourth sliding block, the third sliding block is threadedly connected to the first segment of the second threaded rod, the fourth sliding block is threadedly connected to the second segment of the second threaded rod, the screen body connecting member further comprises:
a first screen body connecting member connected to the third sliding block; and
a second screen body connecting member connected to the fourth sliding block, and the second threaded rod drives the third sliding block and the fourth sliding block to move in the first direction when the second threaded rod rotates relative to the main body support member.

13. The support structural member according to claim 12, wherein a thread pitch of the second threaded rod is same as a thread pitch of the first threaded rod, and a rotational speed of the second threaded rod is 2 times a rotational speed of the first threaded rod; or
a rotational speed of the second threaded rod is same as a rotational speed of the first threaded rod, a thread pitch of the second threaded rod satisfies a formula: $P21+P22=2P11+2P12$, $P21$ is a thread pitch of the first segment of the second threaded rod, $P22$ is a thread pitch of the second segment of the second threaded rod, $P11$ is a thread pitch of the first segment of the first threaded rod, and $P12$ is a thread pitch of the second segment of the first threaded rod.

14. The support structural member according to claim 12, wherein the second driving mechanism further comprises:
a tension mechanism comprising a first elastic member, a first connecting base, a second elastic member and a second connecting base, the first connecting base is movably connected to the first segment of the second threaded rod, the second connecting base is movably connected to the second segment of the second threaded rod, the first screen body connecting member is connected to the first connecting base, one end of the first elastic member is connected to the first connecting base, the other end of the first elastic member is connected to the third sliding block, the second screen body connecting member is connected to the second connecting base, one end of the second elastic member is connected to the second connecting base, the other end of the second elastic member is connected to the fourth sliding block, the first elastic member exerts a tension force on the first connecting base in the first direction, and the second elastic member exerts the tension force on the second connecting base in the first direction.

15. The support structural member according to claim 11, wherein a thread pitch of the second threaded rod is same as a thread pitch of the first threaded rod, and a rotational speed of the second threaded rod is 3 times a rotational speed of the first threaded rod; or
a rotational speed of the second threaded rod is same as a rotational speed of the first threaded rod, the thread pitch of the second threaded rod satisfies a formula: $P2=P11+2P12$ or $P2=2P11+P12$, $P2$ is the thread pitch of the second threaded rod, $P11$ is a thread pitch of the first segment of the first threaded rod, and $P12$ is a thread pitch of the second segment of the first threaded rod.

16. The support structural member according to claim 11, wherein the driving portion further comprises:
a linkage mechanism configured to enable the first threaded rod and the second threaded rod to rotate simultaneously, the linkage mechanism comprises a gear set, and the first threaded rod and the second threaded rod are transmittingly connected through the gear set.

17. The support structural member according to claim 11, wherein the first driving mechanism further comprises:
a first guiding rail, the first sliding block and the second sliding block are movably connected to the first guiding rail; and the second driving mechanism further comprises:
a second guiding rail, and the third sliding block is movably connected to the second guiding rail.

18. The support structural member according to claim 11, wherein the second driving mechanism further comprises:
a tension mechanism comprising a first elastic member and a first connecting base, the first connecting base is movably connected to the second threaded rod, the screen body connecting member is connected to the first connecting base, one end of the first elastic member is connected to the first connecting base, the other end of the first elastic member is connected to the third sliding block, and the first elastic member exerts a tension force on the first connecting base in the first direction.

19. A display device comprising:
a flexible screen; and
the support structural member according to claim 1, wherein the screen body support surface is configured to support the flexible screen, a first end of the flexible screen is connected to an end of the first sliding support member away from the second sliding support member, and a second end of the flexible screen is wrapped around the second sliding support member and bent towards a side of the support frame facing away from the screen body support surface; or the second end of the flexible screen is connected to an end of the second sliding support member away from the first sliding support member, and a first end of the flexible screen is wrapped around the first sliding support member and bent towards a side of the support frame facing away from the screen body support surface, and a second end of the flexible screen is wrapped around the second sliding support member and bent towards a side of the support frame facing away from the screen body support surface.

* * * * *